United States Patent
Pi et al.

(10) Patent No.: US 6,571,035 B1
(45) Date of Patent: May 27, 2003

(54) FIBER OPTICAL SWITCHES BASED ON OPTICAL EVANESCENT COUPLING BETWEEN TWO FIBERS

(75) Inventors: Bo Pi, Carlsbad, CA (US); Shulai Zhao, Encinitas, CA (US)

(73) Assignee: Oluma, Inc., Carlsbad, CA (US)

( * ) Notice: Subject to any disclaimer, the term of this patent is extended or adjusted under 35 U.S.C. 154(b) by 0 days.

(21) Appl. No.: 09/927,095

(22) Filed: Aug. 10, 2001

Related U.S. Application Data

(63) Continuation-in-part of application No. 09/905,038, filed on Jul. 12, 2001, now Pat. No. 6,490,391, which is a continuation-in-part of application No. 09/796,373, filed on Feb. 27, 2001, now Pat. No. 6,516,114.
(60) Provisional application No. 60/224,556, filed on Aug. 10, 2000.

(51) Int. Cl.[7] .................................................. G02B 6/26
(52) U.S. Cl. .............................. 385/30; 385/15; 385/31; 385/39
(58) Field of Search ............................... 385/15, 16, 28, 385/30, 31, 32, 39, 65, 83

(56) References Cited

U.S. PATENT DOCUMENTS

| 4,021,097 A | 5/1977 | McMahon |
|---|---|---|
| 4,136,929 A | 1/1979 | Suzaki |
| 4,259,016 A | 3/1981 | Schiffner |

(List continued on next page.)

FOREIGN PATENT DOCUMENTS

| DE | 28 12 346 A1 | 3/1978 |
|---|---|---|
| EP | 0178045 A1 | 4/1986 |
| FR | 2613844 A1 | 10/1988 |
| JP | 52-14430 A2 | 2/1977 |
| JP | 52-24539 | 2/1977 |
| JP | 53-91752 A2 | 8/1978 |
| JP | 54-4153 A2 | 1/1979 |
| JP | 54-8542 | 1/1979 |
| JP | 54-68651 | 1/1979 |
| JP | 54-101334 A2 | 8/1979 |
| JP | 54-118255 A2 | 9/1979 |
| JP | 56-85702 | 7/1981 |
| JP | 58-10701 | 1/1983 |
| JP | 60-131503 | 7/1985 |
| JP | 64-50003 | 2/1989 |
| JP | 1-130106 | 5/1989 |
| JP | 1-222205 | 9/1989 |
| JP | 1-255803 | 10/1989 |
| JP | 4-31801 | 2/1992 |
| WO | WO 87/03676 | 6/1987 |

OTHER PUBLICATIONS

McCallion et al., "Side–polished fiber provides functionality and transparency," (Abstract) Laser Focus World, vol. 34, No. 9, S19–20, S22, S24, PennWell Publishing, Sep., 1998.

Das et al., "Automatic determination of the remaining cladding thickness of a single–mode fiber half–coupler," (Abstract) Optics Letters, vol. 19, No. 6, p. 384–6, Mar. 15, 1994.

Ishikawa et al., "A New optical attenuator using the thermal diffusion of W–cladding fiber," (Abstract) MOC/GRIN '97 Technical Digest of the 6th Microoptics Conf./14th Topical Meeting on Gradient–Index Optical Systems in Tokyo, Japan, p. (vii+432+27), 208–11, Oct. 1997.

(List continued on next page.)

Primary Examiner—John D. Lee
Assistant Examiner—Jennifer Doan
(74) Attorney, Agent, or Firm—Fish & Richardson P.C.

(57) ABSTRACT

Fiber optical devices formed on substrates fabricated with grooves that operate based on evanescent optical coupling through a side-polished fiber surface in each fiber involved. A coupling control layer is formed between two fibers to control the evanescent coupling for optical switching operations.

22 Claims, 14 Drawing Sheets

U.S. PATENT DOCUMENTS

| | | | |
|---|---|---|---|
| 4,301,543 A | | 11/1981 | Palmer |
| 4,302,071 A | | 11/1981 | Winzer |
| 4,307,933 A | | 12/1981 | Palmer et al. |
| 4,315,666 A | | 2/1982 | Hicks, Jr. |
| 4,378,539 A | | 3/1983 | Swanson |
| 4,392,712 A | | 7/1983 | Ozeki |
| 4,431,260 A | | 2/1984 | Palmer |
| 4,479,701 A | * | 10/1984 | Newton et al. .......... 350/96.16 |
| 4,493,528 A | | 1/1985 | Shaw et al. |
| 4,536,058 A | | 8/1985 | Shaw et al. |
| 4,556,279 A | | 12/1985 | Shaw et al. |
| 4,560,234 A | * | 12/1985 | Shaw et al. .............. 350/96.15 |
| 4,564,262 A | | 1/1986 | Shaw |
| 4,601,541 A | | 7/1986 | Shaw et al. |
| 4,688,882 A | | 8/1987 | Failes |
| 4,721,352 A | * | 1/1988 | Sorin et al. .............. 350/96.15 |
| 4,723,827 A | * | 2/1988 | Shaw et al. .............. 350/96.15 |
| 4,778,237 A | * | 10/1988 | Sorin et al. .............. 350/96.15 |
| 4,784,453 A | * | 11/1988 | Shaw et al. .............. 350/96.16 |
| 4,828,350 A | | 5/1989 | Kim et al. |
| 4,842,358 A | * | 6/1989 | Hall ....................... 350/96.15 |
| 4,869,567 A | | 9/1989 | Millar et al. |
| 4,896,932 A | | 1/1990 | Cassidy |
| 4,900,118 A | | 2/1990 | Yanagawa et al. |
| 4,986,624 A | | 1/1991 | Sorin et al. |
| 4,991,922 A | | 2/1991 | Dahlgren |
| 5,029,961 A | | 7/1991 | Suzuki et al. |
| 5,042,896 A | | 8/1991 | Dahlgren |
| 5,100,219 A | | 3/1992 | Takahashi |
| 5,329,607 A | | 7/1994 | Kamikawa et al. |
| 5,444,723 A | | 8/1995 | Chandonnet et al. |
| 5,533,155 A | | 7/1996 | Barberio et al. |
| 5,586,205 A | | 12/1996 | Chen et al. |
| 5,623,567 A | | 4/1997 | Barberio et al. |
| 5,651,085 A | | 7/1997 | Chia |
| 5,729,641 A | | 3/1998 | Chandonnet et al. |
| 5,781,675 A | | 7/1998 | Tseng et al. |
| 5,809,188 A | | 9/1998 | Tseng et al. |
| 5,841,926 A | | 11/1998 | Takeuchi et al. |
| 5,854,864 A | | 12/1998 | Knoesen et al. |
| 5,892,857 A | | 4/1999 | McCallion |
| 5,900,983 A | | 5/1999 | Ford et al. |
| 5,903,685 A | | 5/1999 | Jones et al. |
| 5,915,063 A | | 6/1999 | Colbourne et al. |
| 5,940,556 A | | 8/1999 | Moslehi et al. |
| 5,963,291 A | | 10/1999 | Wu et al. |
| 5,966,493 A | | 10/1999 | Wagoner et al. |
| 5,970,201 A | | 10/1999 | Anthony et al. |
| 6,011,881 A | | 1/2000 | Moslehi et al. |
| 6,026,205 A | | 2/2000 | McCallion et al. |
| 6,038,359 A | | 3/2000 | Moslehi et al. |
| 6,052,220 A | | 4/2000 | Lawrence et al. |
| 6,058,226 A | | 5/2000 | Starodubov |
| 6,130,984 A | | 10/2000 | Shen et al. |
| 6,134,360 A | | 10/2000 | Cheng et al. |
| 6,144,793 A | | 11/2000 | Matsumoto et al. |
| 6,185,358 B1 | | 2/2001 | Park |

OTHER PUBLICATIONS

Matejec et al., "Optical fiber with novel geometry for evanescent–wave sensing," (Abstract) Sensors and Actuators B, (Chemical), vol. B29, No. 1–3, p. 416–22, Elsevier Publishing, Oct. 1995.

Alonso et al., "Single–mode, optical–fiber sensors and tunable wavelength filters based on the resonant excitation of metal–clad modes," (Abstract) Applied Optics, vol. 33, No. 22, p. 5197–201, Aug. 1, 1994.

Tomita et al., "Leaky–mode loss of the second propagating mode in single–mode fibres with index well profiles," (Abstract) Applied Optics, vol. 24, No. 11, p. 1704–7, Jun. 1, 1995.

Leminger et al., "Determination of the variable core–to–surface spacing of single–mode fiber–coupler blocks," (Abstract) Optics Letters, vol. 12, No. 3, p. 211–13, Mar., 1987.

Morshnev et al., "A fiber thermo–optical attenuator," (Abstract) Source: Radiotekhnika i Elektronika, Translated in: Soviet Journal of Communications Technology & Electronics, vol. 30, No. 9, p. 148–50, Sep., 1985.

Takahashi Mitsuo, "Variable light attenuator of improved air–gap type with extremely low returning light," (Abstract) Conf. Record—IEEE Instrumentation and Measurement Tech. Conf. 2, p. 947–950, 1994.

Schmidt et al., "New design approach for a programmable optical attenuator," (Abstract) Hewlett–Packard Journal, v. 46, n. 1, p. 34–39, 1995.

Hayata et al., "Algebraically decaying modes of dielectric planar waveguides," Optics Letters, vol. 20, No. 10, p. 1131–32, May 15, 1995.

Vengsarkar et al., "Photoinduced refractive–index changes in two–mode, elliptical–core fibers: sensing applications," Optics Letters, vol. 16, No. 19, p. 1541–43, Oct. 1, 1991.

Pantchev et al., "Method of Refractive Index Profile Reconstruction from Effective Index of Planar Optical Monomode Waveguides: Application to Potassium Ion–Exchnaged Waveguides," IEEE Journal of Quantum Electronics, vol. 29, No. 1, p. 154–60, Jan. 1993.

Ikeda et al., "Anaysis of the Attenuation Ratio of MQW Optical Intensity Modulator for 1.55 $\mu$m Wavelength Taking Account of Electron Wave Function Leakage," IEEE Journal of Quantum Electronics, vol. 32, No. 2, p. 284–92, Feb. 1996.

S. Masuda, "Variable attenuator for use in single–mode fiber transmission systems," Applied Optics vol. 19, No. 14, p. 2435–38, Jul. 15, 1980.

Huang et al., "Field–Induced Waveguides and Their Application to Modulators," IEEE Journal of Quantum Electronics, vol. 29, No. 4, p. 1131–1143, Apr. 1993.

Iztkovich et al., "In–Situ Investigation of Coupling Between a Fibre and a Slab Waveguide," Tel Aviv University, Israel, May 29, 1990.

Brierley et al., "Amplitude and phase characterization of polished directional half–couplers with variable refractive index overlays" Optical Engineering, vol. 27, No. 1, p. 045–49, Jan. 1988.

Scholl et al., "In–line fiber optical attenuator and powermeter," SPIE vol. 1792 Components of Fiber Optic Applications VII, p. 65–70, 1992.

Tsujimoto et al., "Fabrication of Low–Loss 3 dB Couplers With Multimode Optical Fibres," Electronic Letters, vol. 14, No. 5, Mar. 2, 1978.

* cited by examiner-

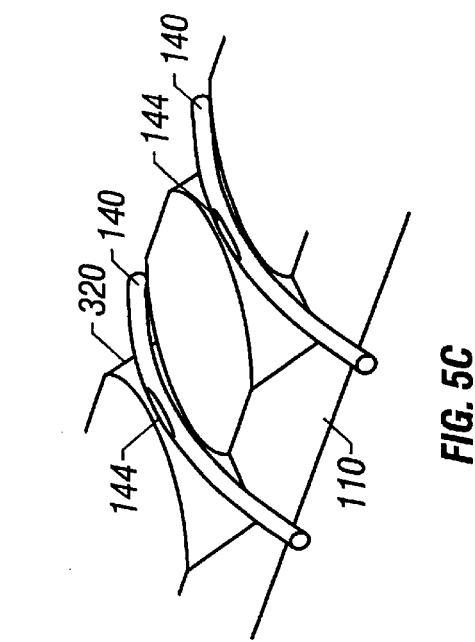
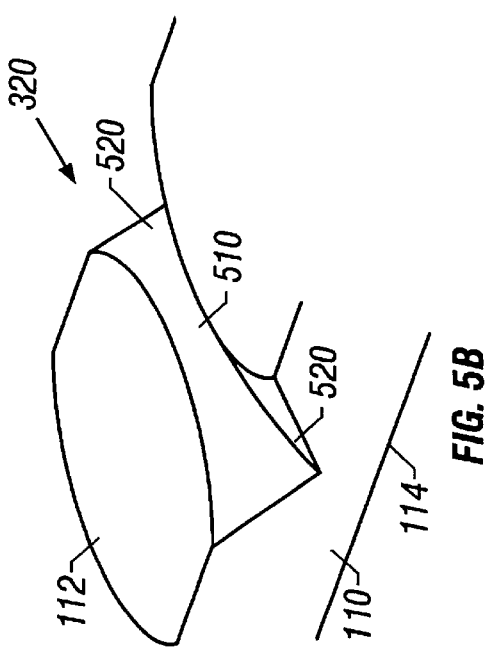
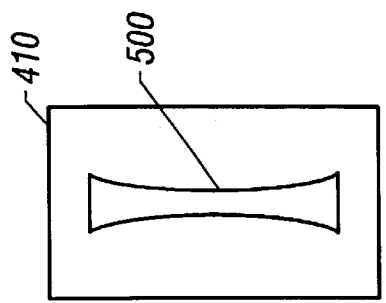

FIBER OPTICAL SWITCHES BASED ON OPTICAL EVANESCENT COUPLING BETWEEN TWO FIBERS

This application is a continuation-in-part of U.S. application Ser. No. 09/905,038 entitled "DEVICES BASED ON FIBERS ENGAGED TO SUBSTRATES WITH GROOVES" filed on Jul. 12, 2001, now U.S. Pat. No. 6,490,391, which is a continuation in part of U.S. application Ser. No. 09/796,373 entitled "INTEGRATION OF FIBERS ON SUBSTRATE WITH GROOVES" and filed on Feb. 27, 2001, now U.S. Pat. No. 6,516,114. This application also claims the benefit of U.S. Provisional Application No. 60/224,556 entitled "FIBER OPTIC SWITCH AND SWITCH MATRIX SYSTEM" and filed on Aug. 10, 2000.

BACKGROUND

This application relates to optical fiber devices, and more specifically, to optical switches formed in fibers.

Optical waves may be transported through optical waveguiding elements or "light pipes" such as optical fibers. A typical fiber may be simplified as a fiber core and a cladding layer surrounding the fiber core. The refractive index of the fiber core is higher than that of the fiber cladding to confine the light. Light rays that are coupled into the fiber core within a maximum angle with respect to the axis of the fiber core are totally reflected at the interface of the fiber core and the cladding. This total internal reflection provides a mechanism for spatially confining the optical energy of the light rays in one or more selected fiber modes to guide the optical energy along the fiber core. Optical fibers may be used in transmission and delivery of optical signals from one location to another in a variety of optical systems, including but not limited to, fiber devices, fiber links and fiber networks for data communications and telecommunications. In addition, optical fibers may be used to form various optical devices to modify, filter, or process guided optical energy.

The guided optical energy in a fiber, however, is not completely confined within the core of the fiber. A portion of the optical energy can "leak" through the interface between the fiber core and the cladding via an evanescent field that essentially decays exponentially with the distance from the core-cladding interface. The distance for a decay in the electric field of the guided light by a factor of e≈2.718 is about one wavelength of the guided optical energy. This evanescent leakage may be used to couple optical energy into or out of the fiber core, or alternatively, to perturb the guided optical energy in the fiber core.

BRIEF DESCRIPTION OF THE DRAWINGS

FIGS. 4A, 4B, 5A, 5B, 5C, 5D, and 5E illustrate a process of fabricating V grooves in semiconductor substrates by anistropic etching.

Like reference symbols in the various drawings indicate like elements.

DETAILED DESCRIPTION

The devices and techniques of this application use at least one fiber integrated on or engaged to a substrate fabricated with one or more grooves. One portion of the cladding of this fiber is removed and polished to form a fiber coupling port. The fiber coupling port has a surface that is sufficiently close to the fiber core so that optical energy can be coupled through via evanescent fields out of or into the fiber core.

The following first describes in detail the basic structures for integrating or engaging a fiber to a substrate with at least one fiber coupling port. Next, several embodiments of optical fiber switches based on such fiber modules are described.

Figure 2B:
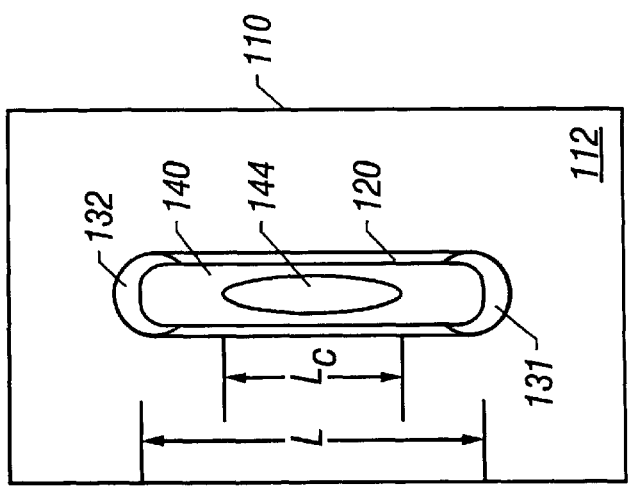
FIGS. 2A and 2B show a cross sectional view of the device in FIG. 1 along the direction AA' and a side view of the device in FIG. 1 along the direction BB', respectively.
Figure 1:
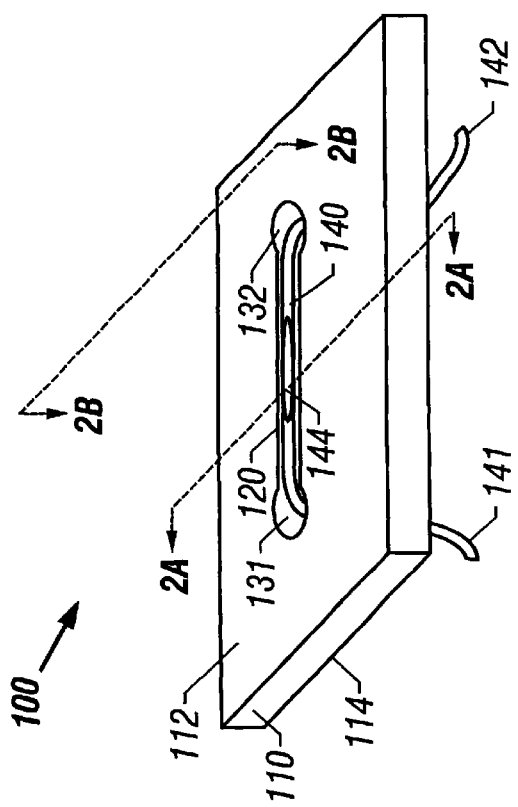
FIG. 1 shows one embodiment of a fiber device that integrates or engages a fiber to a substrate with a groove for positioning the fiber and openings for holding the fiber.
Figure 2A:
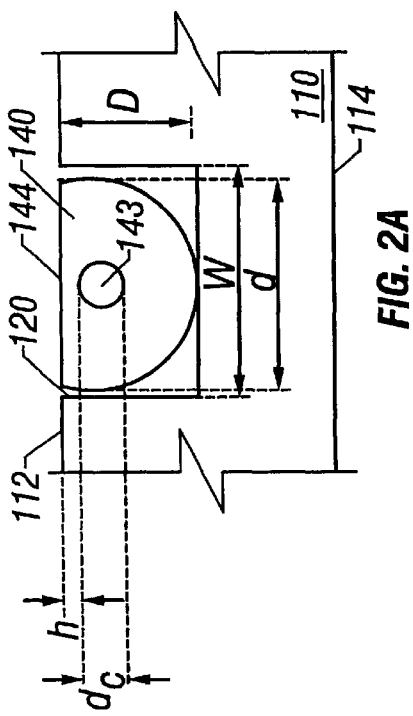

FIG. 1 shows one embodiment of a fiber device 100 where a fiber 140 is integrated or engaged to a substrate 110. The fiber device 100 may be used as a building block to construct a variety of fiber devices, including but not limited to, fiber couplers, fiber attenuators, fiber modulators, fiber beam splitters, optical fiber switches, and fiber frequency-division multiplexers. FIGS. 2A and 2B show additional details of the fiber device 100.

The substrate 110 may be formed of various materials, such as semiconductors, insulators including dielectric materials (e.g., a glass, a quartz, a crystal, etc), metallic materials, or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

Figure 3A:
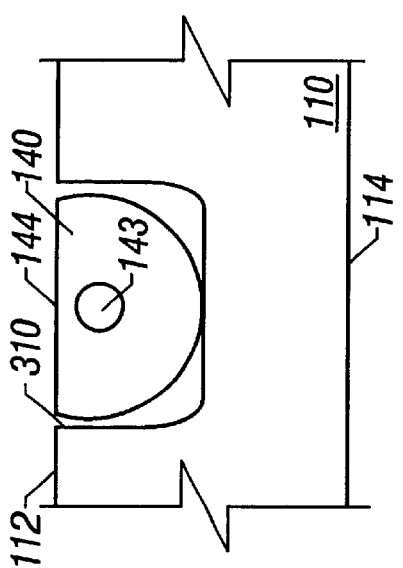
FIGS. 3A and 3B show examples of two different cross sections for grooves shown in FIG. 1.

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 310 in FIG. 3B. The cross sections are generally not so limited and may also be other shapes as well, including rectangular as shown in FIG. 2A, U-shaped as shown by the groove 310 in FIG. 3A, a circularly shape or other suitable shapes.

The width, W, of the groove 120 is generally greater than the diameter, d, of the fiber 140 and may either remain a constant or vary spatially along the groove 120, e.g., increasing from the center towards the two ends. The length, L, of the groove 120 may vary from one grove to another and can be determined based on specific requirements of applications. The depth D of the groove 120 may be a constant or may vary along the groove 120, e.g., increasing from the center towards the two ends. In general, at least a portion of the groove 120 has a depth D to expose a portion of the fiber cladding of the fiber 140 above the surface 112 while still keeping the fiber core below the surface 112. Sometimes, the depth D of the groove 120 may also be selected to expose the fiber core. Other portions of the groove 120 may have a different depth so that the fiber can be placed within the groove 120 under the substrate surface 112. Depending on the geometry of the groove 120 (e.g., the apex angle of a V-shaped groove), the depth D of the entire groove 120 may be greater than fiber diameter d. For a groove with a rectangular cross section as shown in FIG. 2A, at least a portion of the groove 120 has a depth D less than the fiber diameter d but greater than the sum of the fiber radius r=d/2 and radius of the fiber core rc=dc/2. This portion of the groove 120 exposes partial fiber cladding of the fiber 140 above the surface 112 while still keeping the fiber core below the surface 112. Other portions of the groove 120 may have a depth that is at least the fiber diameter d so that the fiber can be essentially placed in the groove 120 below the surface 112. However, in certain applications such as the device shown in FIG. 12, the depth D of the entire groove 120 may be greater than fiber diameter d. Unless otherwise indicated, the following description will assume that at least a portion of a groove 120 to expose a portion of the fiber cladding above the surface 112 and adjacent portions sufficiently deep to keep the fiber below the surface 112. In case of the rectangular groove 120, the central portion of the groove 120 may have a depth D less than d but greater than (d+dc)/2 while the portions on either sides of the central portion may have a depth equal to or greater than the fiber diameter d.

Notably, the fiber device 100 includes two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed and polished to form a flat surface 144 of a length Lc that is above the fiber core 143 and is substantially coplanar with the surface 112 of the substrate 110. When the spacing, h, between the flat surface 144 and the fiber core 142 is sufficiently small (e.g., on the order of or less than one wavelength of optical energy), the flat surface 144 can be used to couple optical energy into or out of the fiber core 144 through the evanescent fields outside the fiber core. Hence, the length, Lc, of the flat surface 144 approximately represents the optical coupling length for the fiber device 100. This coupling surface 144 may also be non-flat, e.g., curved to a certain extent, as long as it can transmit evanescent signals.

Figure 3B:
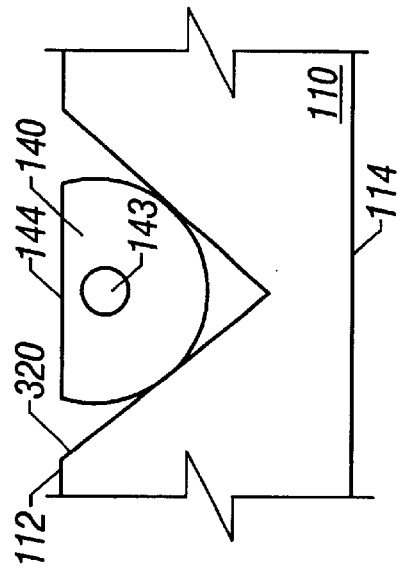
Figure 4A:
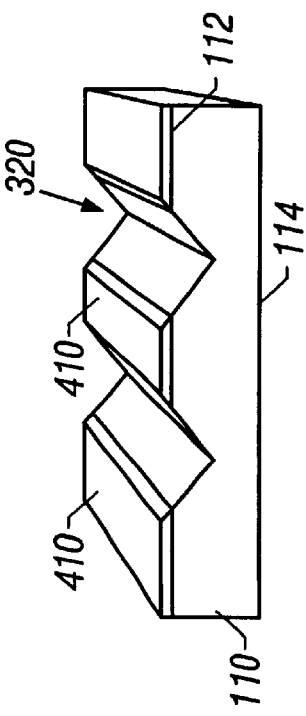
Figure 4B:
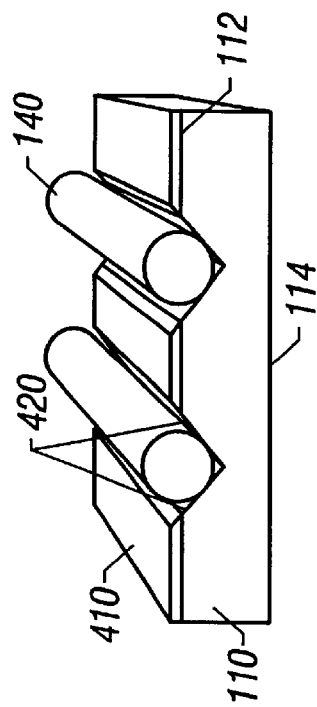

FIGS. 4A and 4B illustrate the fabrication of the V groove 320 and placement of the fiber 140 in the V groove 320 as shown in FIG. 3B. First, a mask layer 410 is deposited over the surface 112 of the substrate 110 and is patterned by a suitable technique such as a photolithography process to have one or more groove areas exposing the underlying substrate 110. Next, the exposed portions of the substrate 110 are anistropically etched to form V grooves.

If the substrate 110 is formed of a semiconductor, e.g., silicon, a thermally-grown silicon oxide or nitride film may be used as the etching mask 410 for anisotropic silicon etching. When the surface 112 is in the crystalline plane (100) of the Si substrate 110 and the groove patterns in the etching mask 410 are parallel to the crystalline plane (110), an etchant chemical such as alkaline (KOH) can be applied on the silicon (100) surface to produce truncated v-shaped grooves. Since the anisotropic etching is stopped at the crystalline plane (111), the dimension of the V grooves, such as the groove width and depth can be accurately controlled by properly selecting the dimension of the groove patterns formed in the etching mask 410.

Referring to FIG. 4B, after the grooves 320 are formed, the fibers 140 can be placed in the grooves 320 and bonded to the groves 320 at locations 420. The bonding may be implemented by a number of techniques, including but not limited to using an epoxy, glass frit thermal bond, or CO2 assisted thermal bond. When multiple grooves 320 are formed, an array of fibers 140 can be precisely aligned in the grooves 320 with a predetermined spacing. The exposed cladding of the fiber 140 can then be removed and polished to form the flat surface 144 as shown in FIG. 3B.

Figure 5E:
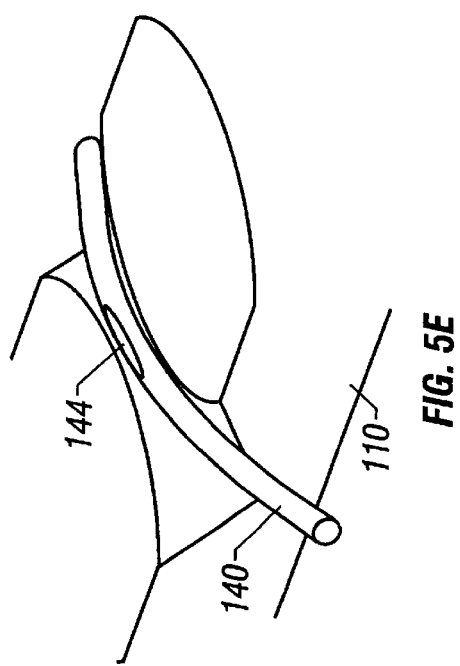
Figure 5D:
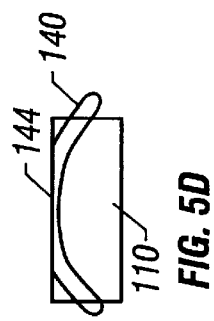

FIG. 5A shows one exemplary groove pattern 500 formed in the etching mask layer 430 in FIG. 4A. FIG. 5B illustrates the corresponding V groove 320 in the silicon substrate. 110 formed from the anistropic etching by using the mask 500. The opening of the groove pattern 500 is designed to gradually widen from the center to both sides along the groove to be formed. Accordingly, the width and depth of the underlying V groove 320 also increase from the center portion 510 to side portions 520 that are spaced from the center along the groove 320. As illustrated, the surfaces of the V groove 320 are not flat but are curved as a result of etching through the above mask 500. FIGS. 5C, 5D, and 5E show the placement of fibers 140 in the above V-groove structure.

Figure 6:
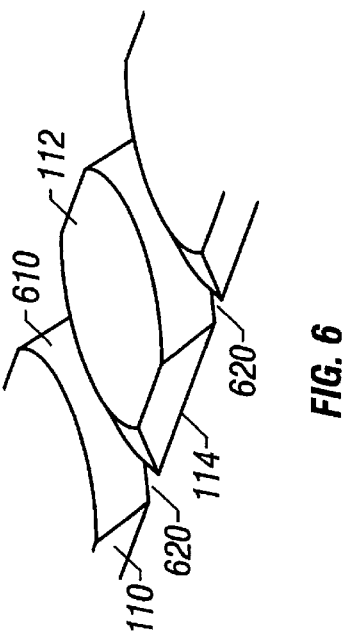
FIG. 6 illustrates formation of openings in V grooves by anistropc etching.

The above anistropic etching may be used to form both the V groove 320 and the openings 131 and 132 at both sides of the V groove 320 as shown in FIG. 1. Referring to FIG. 6, when opening of the groove pattern 500 in the etching mask 410 is sufficiently wide, side portions 620 of the V groove 610 can extend all the way through the substrate 110 from the surface 112 to the opposite surface 114 and hence create an opening 620 on the surface 114. The openings 620, therefore, can be used as the openings 131 and 132 to allow the fiber 140 to go through the substrate 110 from the surface 112 to the opposite surface. 114.

Figure 7A:
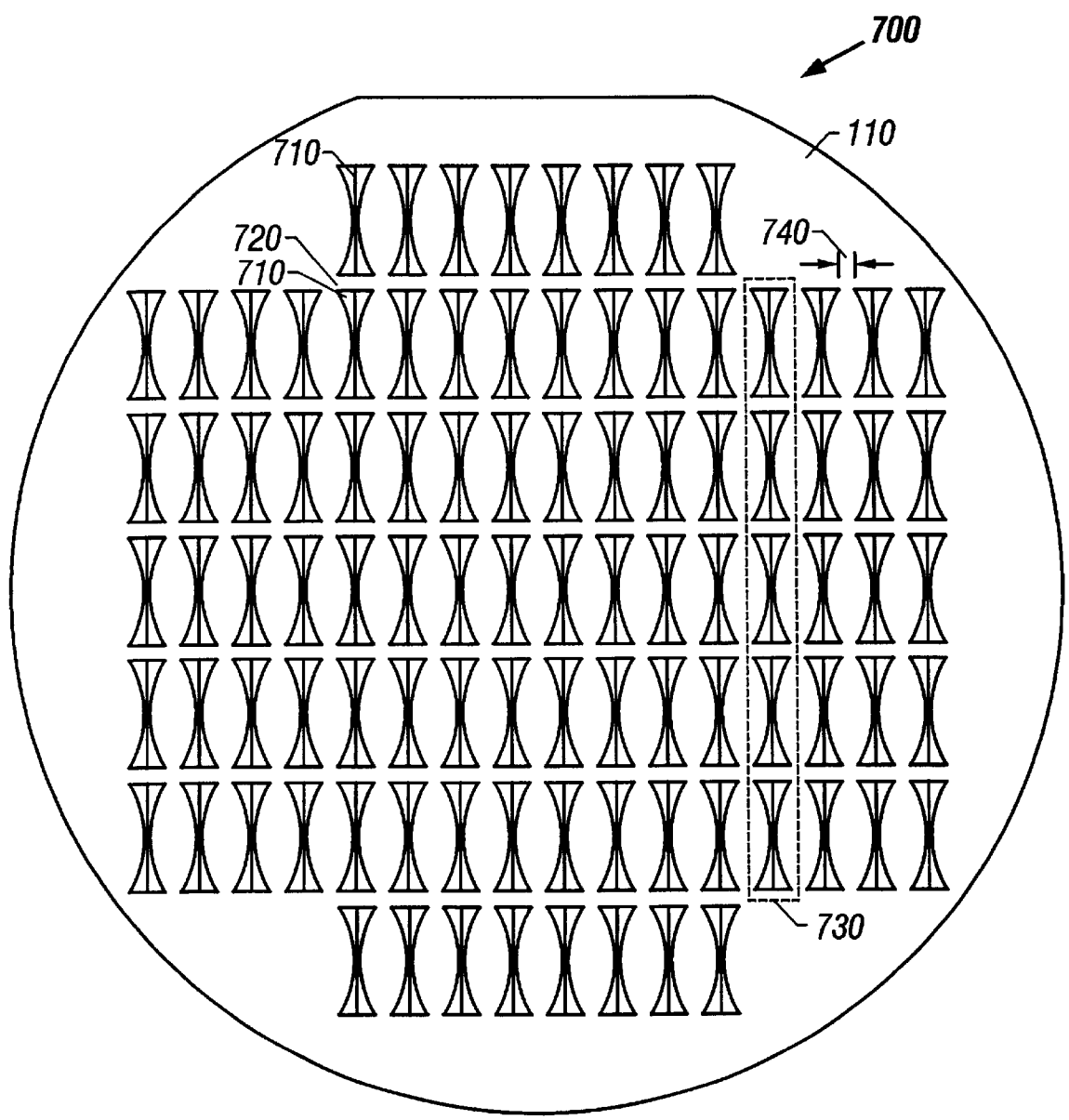
FIG. 7A shows a substrate that is fabricated with an array of grooves with openings.
Figure 7B:
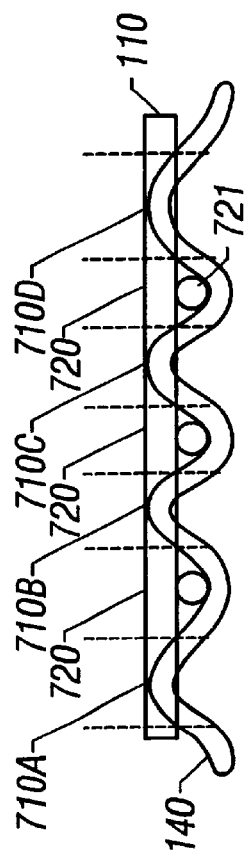
FIG. 7B shows a fiber device formed on a substrate with two or more grooves aligned with each other along a straight line on a single side of the substrate.

FIGS. 7A and 7B show that an array 700 of such V grooves 710 with two openings can be formed on one side of the substrate 110. The V grooves 710 may be aligned to be parallel to one another along their elongated directions and are arranged to form multiple parallel columns 730 with a spacing 740. Within each column 730, multiple V grooves 710 may be spaced from one another by a spacing 720. The substrate 110 with the array 700 may diced into multiple units each having one or more V grooves 710. Such units can be used to form various fiber devices. Hence, a batch fabrication process may be used to process the substrate 110 and to simultaneously form multiple fiber devices with V grooves 710.

A single fiber can be threaded through different V grooves 710 in a column 730 between the surfaces 112 and 114 via the openings 131 and 132. FIG. 7B shows an example where the fiber 140 is threaded through V grooves 710A, 710B, 710C, and 710D formed along a straight line on the surface 112 of the substrate 110. A spacer 721, such as a rod, may be optionally positioned on the surface 114 between the openings of two adjacent V grooves to provide a support to the fiber 140. Such support may be used to reduce sharp bending of the fiber 140 which may damage the fiber 140. After bonding and polishing the fiber 140, a coupling port is formed at each V groove on the surface 112 and is operable to couple optical energy out of or into the fiber 140. Therefore, this device has multiple coupling ports on the surface 112 to couple optical energy into or out of the fiber 140. When a proper control mechanism is implemented at each coupling port, optical switching, optical multiplexing, and other coupling operations may be achieved.

Figure 7C:
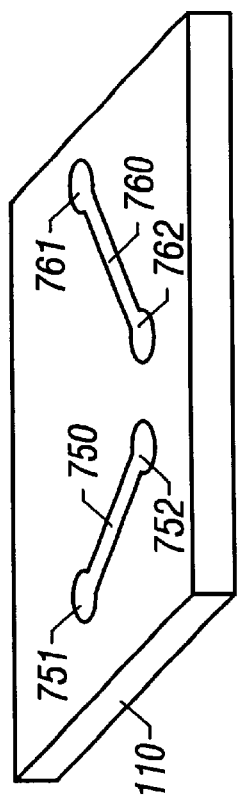
FIGS. 7C and 7D show fiber devices formed on a substrate with grooves on a single side of substrate that are oriented in different relative directions.
Figure 7D:
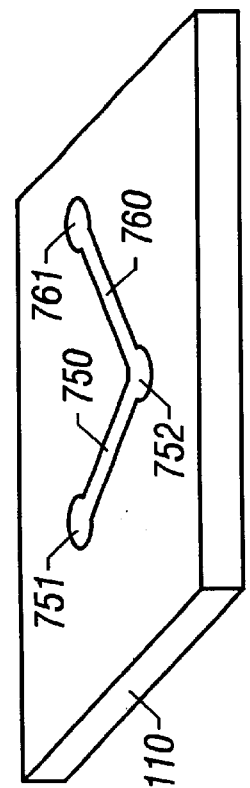

FIGS. 7C and 7D show additional embodiments of fiber devices that two different grooves 750 and 760 on the substrate 110 are not aligned along a straight line as in FIGS. 7A and 7B but form an angle with respect to each other. Numerals 751, 752, 761, and 762 indicate the openings of the grooves 750 and 760 that penetrate through the substrate 110. In FIG. 7C, the two grooves 750 and 760 are spaced from each other. A fiber may be placed in the grooves 750 and 760 by sequentially passing the fiber through the openings 761, 762, 752, and 751. In FIG. 7D, two grooves 750 and 760 are share a common opening 752. Such arrangements may be combined with aligned grooves.

Referring back to FIG. 1, the groove 120 with its two openings 131 and 132 may be formed on both sides 112 and 114 of the substrate 110 in the following manner. First, two adjacent grooves respectively formed in different sides of the substrate are aligned along the same groove direction. Second, the groove on one side shares an opening with the adjacent groove on the opposite side of the substrate 110. Techniques such as the double-sided photolithography may be used to form the V grooves on both surfaces of the substrate. Unlike the fiber device shown in FIG. 7B where the coupling ports are only on a single side of the substrate, a substrate with V grooves on both sides can form a fiber device with coupling ports on both sides of the substrate. Such double-sided coupling capability can provide flexible and versatile coupling configurations in various fiber devices.

Figure 8A:
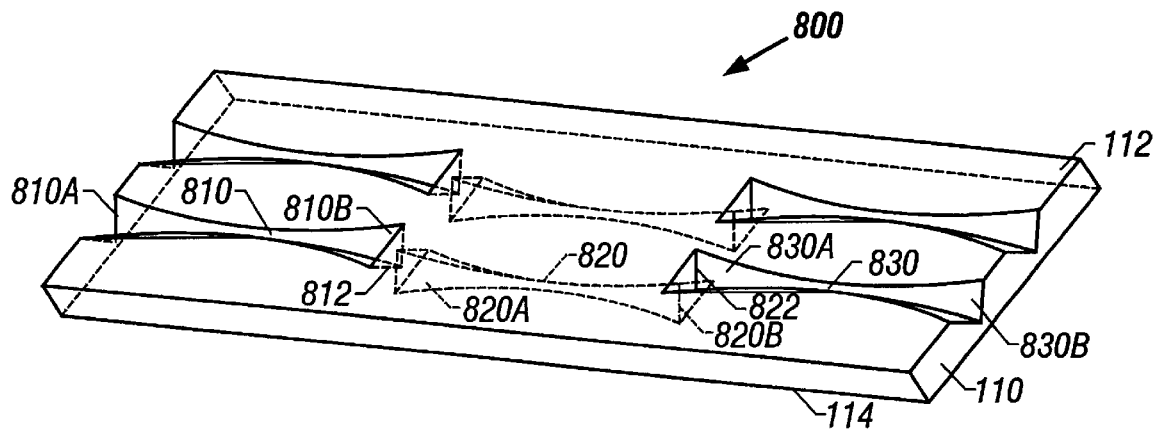
FIGS. 8A, 8B, 8C, 8D, and 9 illustrate substrates that are processed with grooves on both substrate surfaces.
Figure 8B:
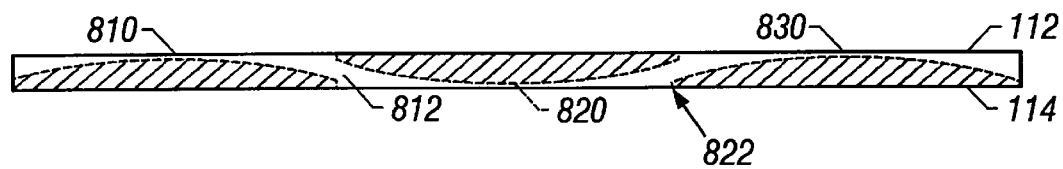
Figure 8C:
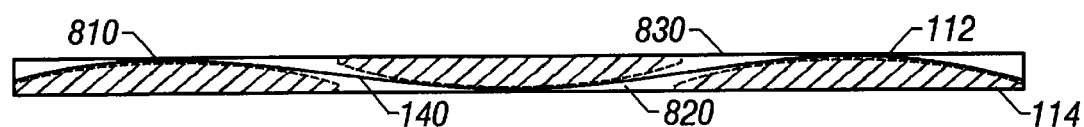

FIGS. 8A, 8B, and 8C illustrate one example of a fiber device 800 that has V grooves on both sides 112 and 114 of the substrate 110. A first V groove 820 is formed on the side 114. Similar to the V grooves in FIGS. 5B and 6, the depth and width of the V groove 820 increase from its center towards both ends 820A and 820B. A second, similar V groove 810 is formed on the opposite side 112 along the same groove direction. The end 810A of the second groove 810 overlaps with the end 820A of the first V groove 820 to create a through hole 812 that connects the V grooves 810 and 820. A third V groove 830 is also shown on the side 112 to have one end 830A overlap with the end 820B of the V groove 820 on the opposite side 114. A through hole 822 is then formed at the overlapping region to connect the V groove 820 to the V groove 830. A fiber 140 is shown in FIG. 8C to thread through the holes 812 and 822 to form coupling ports on both sides 112 and 114 of the substrate 110.

Figure 8D:
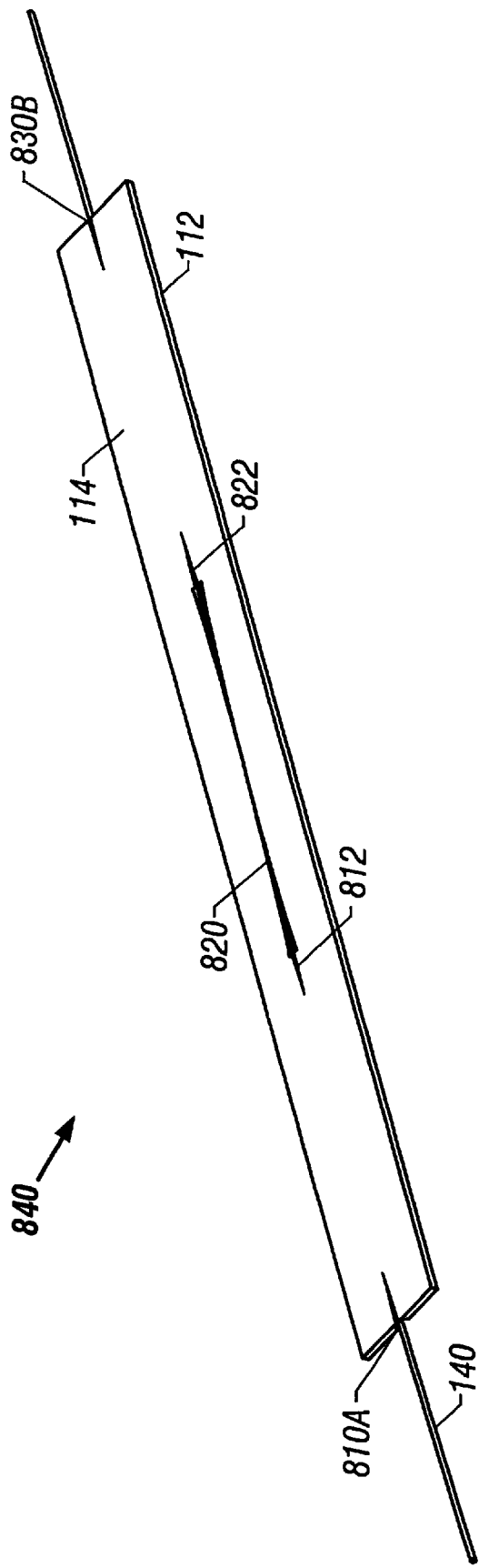
Figure 9:
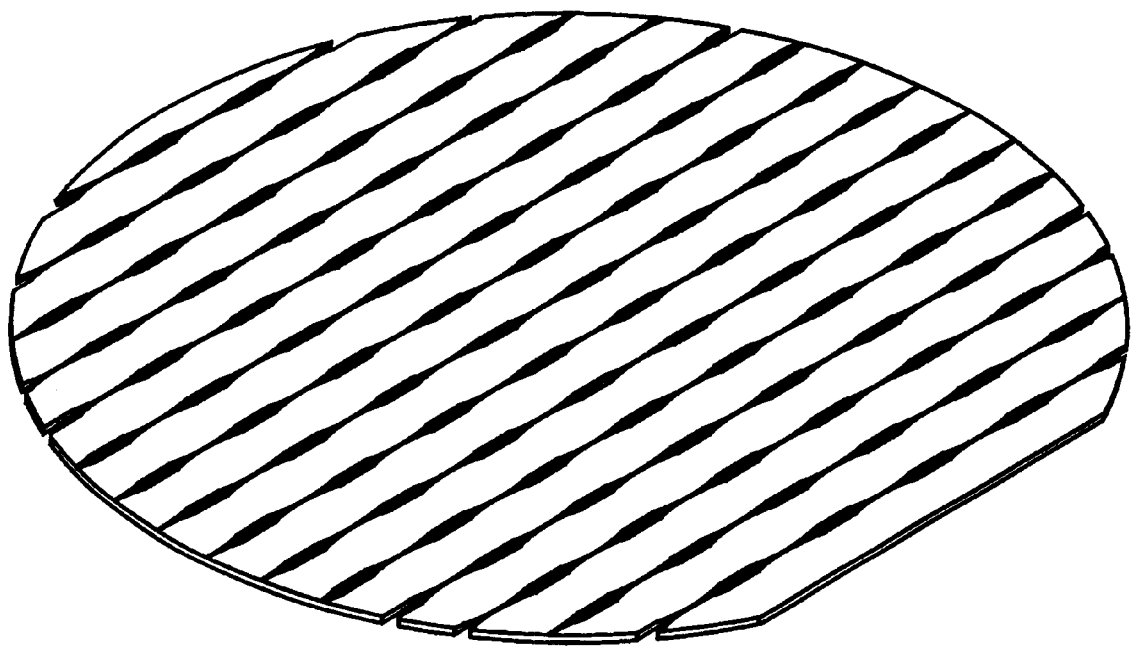

FIG. 8D shows a 3-port fiber device 840 that is formed by dicing a linear array of V grooves 810, 820, and 830 from the substrate 110. Comparing to the single-side device shown in FIG. 7B, the natural curvature of the V grooves formed on both sides eliminates the spacers 740. Similar to the batch fabrication of the single-sided devices shown in FIG. 7A, multiple double-sided devices may also be simultaneously fabricated from a single-sided substrate as illustrated in FIG. 9.

In the above devices with V grooves formed on both sides of the substrate, two adjacent V grooves, located on opposite sides of the substrate, may not be aligned along a straight line but form an angle with each other as illustrated by the adjacent grooves formed on the same side shown in FIGS. 7C and 7D. Similar to the grooves in FIGS. 7A and 7B, two adjacent V grooves, located on opposite sides of the substrate, may also be designed to spatially separate from each other without sharing a common opening that penetrates through the substrate and extends between two sides of the substrate.

The openings in the above examples of V grooves are formed by anistropically etching for forming the V grooves. Hence, there is no need to use a separate process to fabricate the openings if the etching mask is properly designed. However, a separate fabrication step may also be used to form an opening and to achieve any desired geometric shape of the opening that may be difficult or impossible to make through etching the V grooves.

Figure 10:
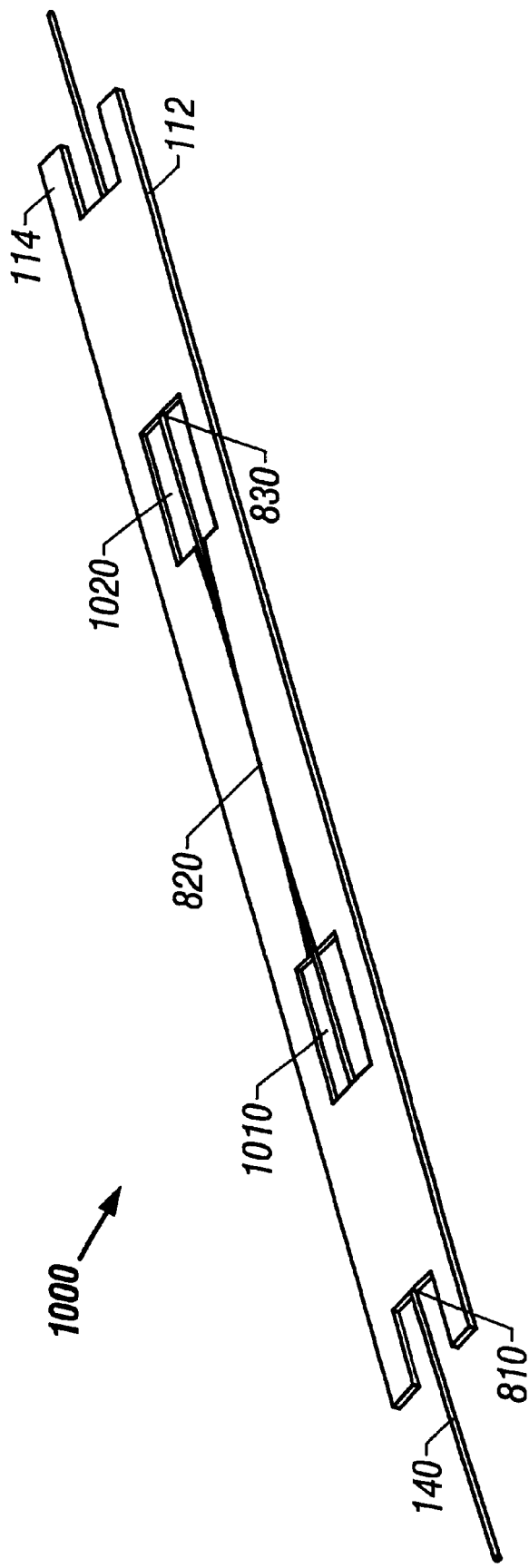
FIG. 10 shows a substrate processed with grooves on both substrate surfaces, where openings at both ends of each groove are separately fabricated from the V grooves.

FIG. 10 illustrates a fiber device 1000 with aligned V grooves 810, 820, and 830 on both sides 112 and 114 of the substrate 110 that are spaced from one another by rectangular openings 1010 and 1020. V grooves 810 and 830 are formed on the side 114 and the groove 820 is formed on the opposite surface 112 but is located between the grooves 810 and 830. An etching process separate from etching of the V grooves is needed to form such openings 1010 and 1020. Other processing techniques such as laser machining may also be used to form the openings.

The above fiber devices with V grooves either on one side or two sides may be used to form various fiber devices. Some exemplary devices are described below.

Figure 11:
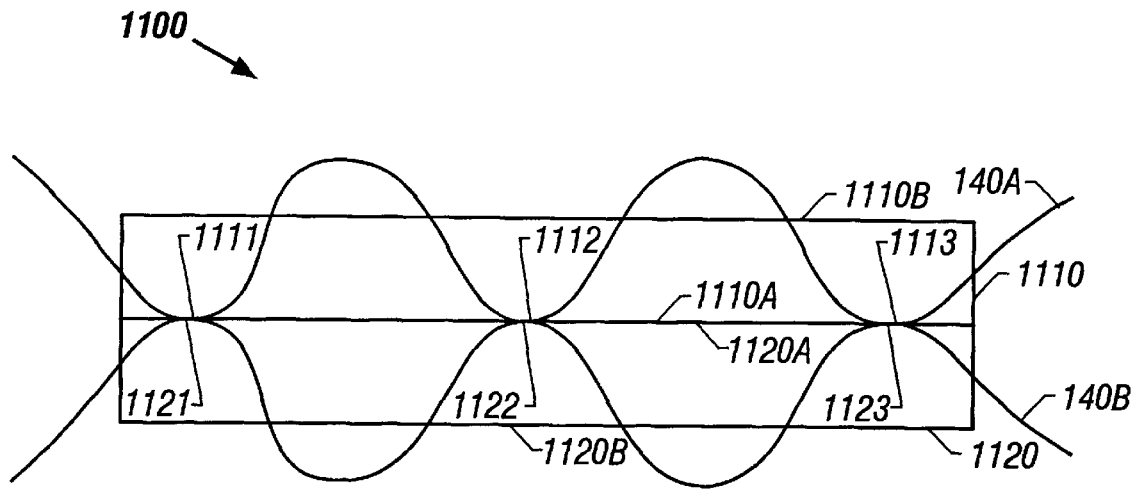
FIGS. 11 and 12 show exemplary fiber devices by integrating fibers to substrates with grooves.

FIG. 11 shows an optical fiber coupler 1100 by using two substrates 1110 and 1120 each with V grooves on a single surface of the substrate. The substrate 1110 has a surface 1110A on which three V grooves are fabricated and a fiber 140A is placed therein to form three coupling ports 1111, 1112, and 1113. Similarly, the substrate 1120 has a surface 1120A on which three V grooves are fabricated and a fiber 140B is placed therein to form three coupling ports 1121, 1122, and 1123. The two substrates 1110 and 1120 are engaged by having the surfaces 1110A and 1120A to face each other. The ports on one substrate substantially overlap with the coupling ports of another substrate to allow energy exchange between the fibers 140A and 140B. Various techniques may be used to engage the two substrates together, such as optical epoxy, glass frit thermal bond, CO2 laser assisted thermal bond.

A fiber device with V grooves on both sides of the substrate can be used to provide coupling on both sides. More coupling flexibility can be achieved in such a device than a device with grooves on only one side. For example, each fiber in the device 1100 shown in FIG. 11 cannot be accessed from the exposed surfaces 1110B and 1120B. Such access would be possible if one of the two substrates 1110 and 1120 were designed to have grooves on both sides. Thus, three or more substrates may be vertically stacked together to form a multi-layer optical coupler. Since each substrate may have two or more fibers, coupling among many fibers in different substrates may be achieved.

Figure 12:
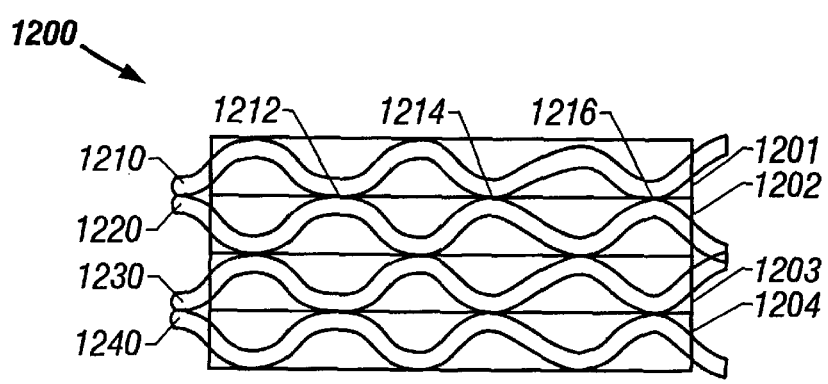

FIG. 12 shows a 4-layer optical multi-port coupler 1200 having 4 different double-sided substrates 1201, 1202, 1203, and 1204 based on the designs shown in FIGS. 8D or 10. Four different fibers 1210, 1220, 1230, and 1240 are respectively threaded in the substrates 1201, 1202, 1203, and 1204. Two adjacent substrates, such as 1201 and 1202, may be coupled to form the coupling ports 1212, 1214, and 1216. Hence, optical energy can be coupled between any two fibers. For example, an optical signal in the fiber 1210 may be coupled to the fiber 1230 by first coupling into the fiber 1220 and then coupling from the fiber 1220 into the fiber 1230. In general, a double-sided substrate can interface at both sides with other single-sided or double-sided substrates.

Figure 13A:
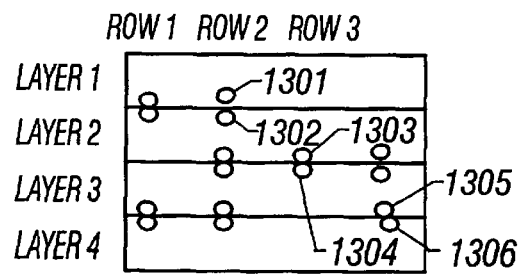
FIG. 13A shows uses of relative positions between grooves to control optical coupling between fibers positioned in the grooves.

FIG. 13A illustrates that optical coupling between two fibers in different layers may be controlled in a number of ways by controlling the relative position of the two fibers in grooves. For example, no optical coupling occurs between fibers 1301 and 1302 in the layers 1201 and 1202 when they are placed in deep grooves to have a separation much greater than one wavelength of the light. The fibers 1303 and 1304 in the layers 1202 and 1203 are positioned in shallow grooves so that a portion of each fiber's cladding is removed to allow for optical coupling. The depth of the grooves for the fibers 1303 and 1304 can be controlled to control the coupling strength via evanescent fields. The fibers 1305 and 1306, also in shallow grooves, are spatially offset in the lateral direction so that the optical coupling is reduced with the amount of the offset.

The grooves for holding fibers 1301 and 1302 are "deep" grooves in that the depth of the groove is greater than the diameter of the fiber so that the fiber cladding in the fiber portion in such grooves is not exposed above the substrate surface and no optical coupling port is formed. The grooves for holding the fibers 1303, 1304, 1305, and 1306, on the other hand, are "shallow" grooves as the groove 120 described with reference to FIG. 1 where a portion of a part of the fiber cladding protrudes above the substrate surface when the fiber is placed in such a groove and can be removed to form an optical coupling port 144. Such deep and shallow grooves may be combined to provide flexibility and versatility in routing fibers and arranging optical coupling ports in a fiber device.

Figure 13B:
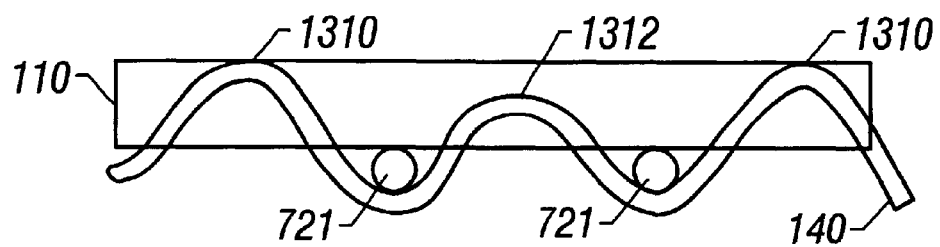
FIGS. 13B shows a substrate with both deep and shallow grooves formed on a single side.
Figure 13C:
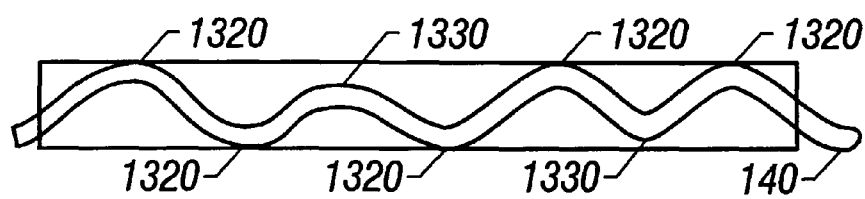
FIG. 13C shows a substrate with both deep and shallow grooves formed on both sides.

FIG. 13B shows a single-sided substrate similar to the substrate in FIG. 7B but processed to have both deep grooves 1312 and shallow grooves 1310. Each deep grove 1312 is used at a location where optical coupling is undesirable. FIG. 13C shows a double-sided substrate with deep grooves 1330 and shallow grooves 1320.

Figure 14:
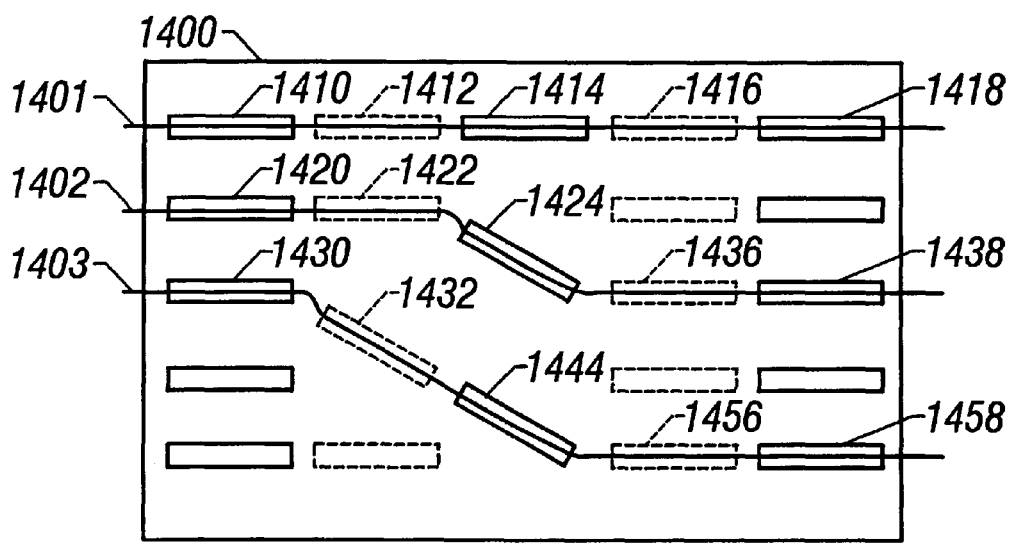
FIG. 14 shows an exemplary fiber device that has lateral jump-channel grooves on the substrate to change a direction of a fiber in the substrate plane.

FIG. 14 further shows that a lateral jump-channel groove 1424 on a substrate 1400 may be used to change the lateral direction of a fiber. The substrate 1400 is shown to have grooves on both sides. Solid elongated boxes such as 1410 represent grooves formed on one side and the dashed elongated boxes such as 1412 represent grooves formed on the other side. The grooves 1410, 1412, 1414, 1416, and 1418 are aligned with one another along a straight line to hold a fiber 1401. The groove 1424 is a lateral jump-channel groove that is oriented with an angle relative to adjacent grooves 1422 and 1436. Hence, a fiber 1402 can be threaded through the lateral jump-channel groove 1424 to run through grooves 1440 and 1422 and then to change its direction to run through grooves 1436 and 1438. Lateral jump-channel grooves 1432 and 1444 are also shown to direct the fiber 1402 from the groove 1430 to grooves 1456 and 1458. A single-side substrate with grooves on one side may also be designed to have such lateral jump-channel grooves.

Such a lateral jump-channel can be combined with the vertical integration of different double-side substrates to change the direction of an optical signal both laterally within a substrate and vertically from one substrate to another substrate. This opens up possibility similar to multi-layer printed circuit board technology allowing sophisticated connections from point to point and from layer to layer.

Figure 15:
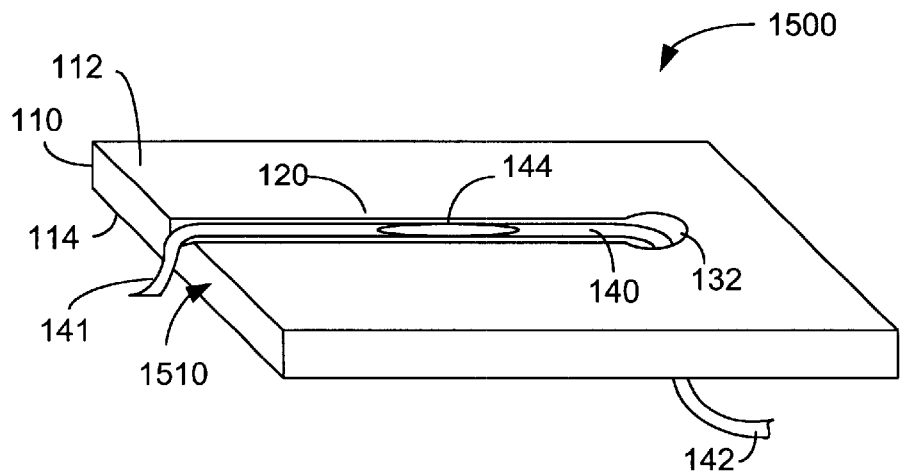
FIG. 15 shows a design to engage a side-polished fiber onto a substrate by using an elongated groove with a single through hole.

FIG. 1 shows the use of elongated groove 120 and two through holes 131 and 132 at the ends of the groove 120 to engage a fiber to the substrate 110 and to form each fiber coupling port 144. Alternatively, only one through hole 132 in the substrate 110 may be used to engage the fiber 140 to form a fiber coupling port 144. FIG. 15 shows an example of such a fiber structure 1500. The groove 120 may extend to one end side 1510 of the substrate 110 so that one end 141 of the fiber 140 leaves the groove 120 without going through a through hole.

Based on the above fiber structures, the following optical switches can be constructed for switching or routing optical signals in fibers.

Figure 16:
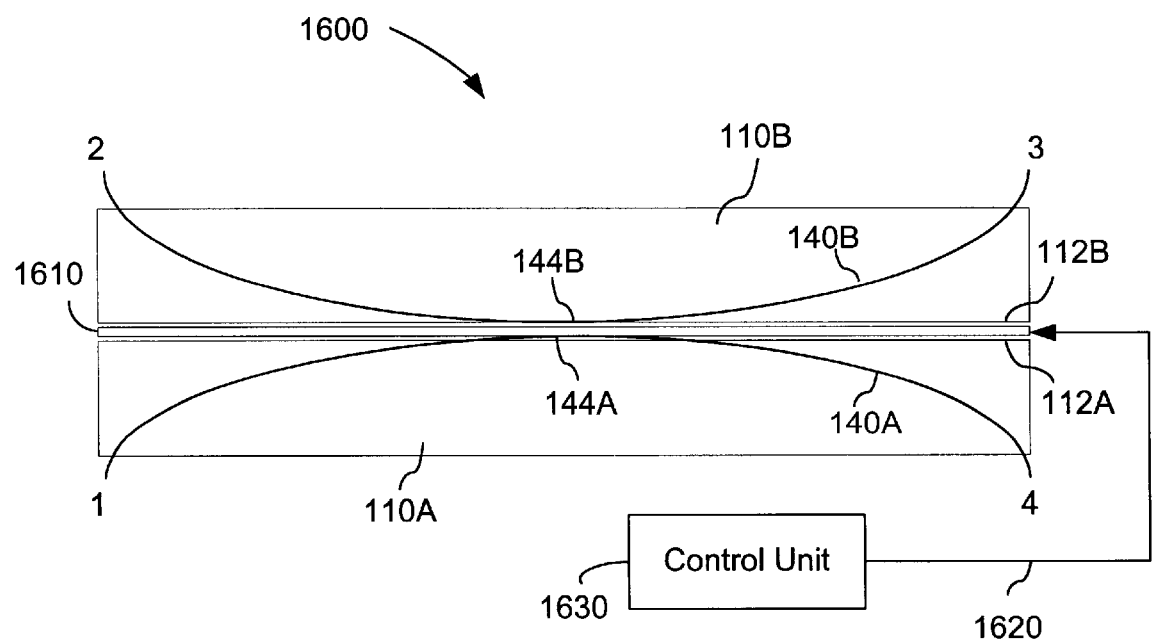
FIG. 16 shows one embodiment of a fiber switch based on evanescent coupling between two fibers.

FIG. 16 shows an optical fiber switch 1600 based on evanescent coupling between a first fiber 140A engaged to a first substrate 110A and a second fiber 140B engaged to a second substrate 110B according to one embodiment. The two substrates 110A and 110B are interfaced with each other by facing their substrate surfaces 112A and 112B to each other so that a side-polished fiber coupling port 144A in the fiber 140A is spaced from a side-polished fiber coupling port 144B by a distance less than one wavelength of the optical energy to be coupled between the fibers 140A and 140B. This switch 1600 is a 4-port device with ports 1 and 4 in the fiber 140A and ports 2 and 3 in the fiber 140B.

The optical switching action between the two fibers 140A and 140B is implemented by a coupling control layer 1610 sandwiched between the Coupling ports 144A and 144B. The coupling control layer 1610 has an optical property that changes in response to an external control signal 1620 applied thereto. For example, the refractive index of the coupling control layer 1610 changes with the control signal 1620. Materials suitable for the coupling control layer 1610 may include, among others, an electro-optic material responsive to an applied electric field as part of the control signal 1620, a photo-sensitive optical material responsive to external optical radiation as part of the control signal 1620 (e.g., nonlinear optical materials), a ferro-optical material whose refractive indices changes with an applied magnetic field as part of the control signal 1620, and a thermo-optic material whose refractive indices responsive to a temperature change caused by a heating or cooling action by the control signal 1620. The thickness of the coupling control layer 1610 should be sufficient small to maintain the evanescent coupling condition between the two fibers 140A and 140B. A control unit 1630 is provided in the switch 1600 to produce and control the control signal 1620.

Referring back to FIG. 2B, the two fibers 140A and 140B have a coupling length Lc approximately equal to the length of the coupling port along the fiber. Hence, the coupling control layer 1610 is in effect to control the coupling strength between the two fibers 140A and 140B. An optical signal at an input wavelength received by either one of the ports 1 and 2 can be coupled to either one of the ports 3 and 4 based on this coupling strength. For example, the control signal 1620 may be set at a first value, where the input optical signal received by the fiber 140B at the input port 2 stays in the fiber 140B after propagating through the coupling section and exits at the port 3. The control signal 1620 may be set to a second value to couple the same input signal into the fiber 140A which exits at the port 4.

Figure 17:
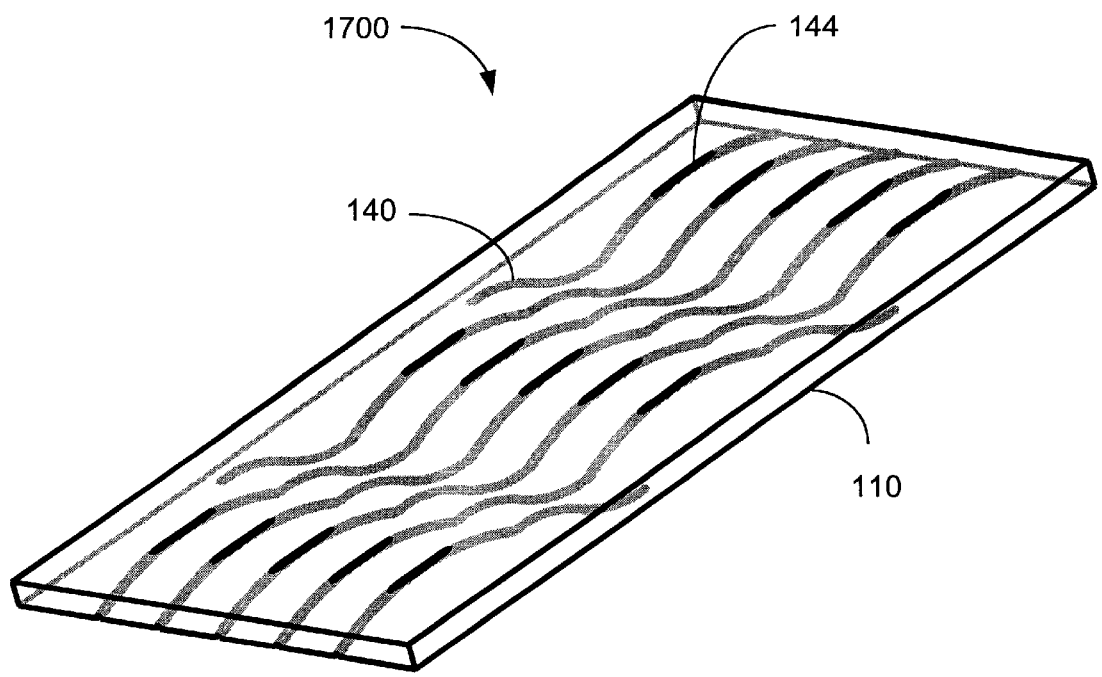
FIG. 17 shows a fiber switch matrix according to one embodiment.

The switch 1600 in fact is formed of two half coupler modules, each having a fiber on a substrate. This design may be extended to an array of fibers with coupling ports formed on a substrate so that a switch matrix can be formed by coupling two half coupler fiber modules with multiple fibers. FIG. 17 shows one example of a half coupler module 1700 with a plurality of fibers 140 engaged to grooves of a substrate 110. Each fiber has one or more fiber coupling ports 144 on one or both substrate surfaces.

Figure 18:
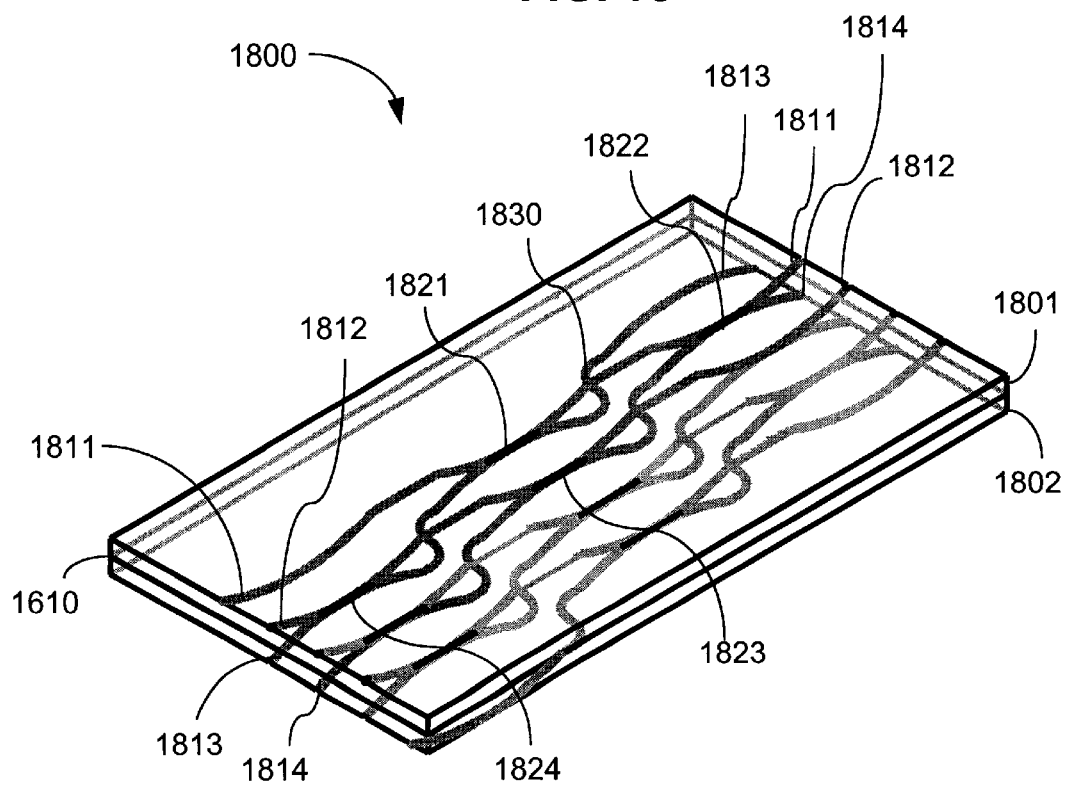
FIG. 18 shows an example of a half coupler fiber module for forming a switch matrix.

FIG. 18 shows a fiber switch matrix module 1800 based on the basic switch design in FIG. 16. Two substrates 1801 and 1802 are used to form two half coupler modules which are engaged to each other with the coupling control layer 1610 therebetween. The substrate 1801 is shown to have grooves for engaging and holding fibers 1811, 1812, and other fibers; the substrate 1802 is shown to have grooves for engaging and holding fibers 1813, 1814, and other fibers. Two similar 2×2 switch matrices are formed in the module 1800. One 2×2 switch matrix is formed by switches 1821 between fibers 1811 and 1813, 1822 between fibers 1811 and 1814, 1823 between fibers 1812 and 1814, and 1824 between fibers 1812 and 1814. Notably, jump-channel grooves shown in FIG. 14 are used to change the directions of fibers in the respective substrates so that desired fiber coupling can be achieved. For example, the fiber 1813 is turned at a location 1830 where a jump-channel groove is formed in the substrate 1802 to form a first switch 1821 with the fiber 1811 and then turned at another jump-channel groove to form a second switch 1824 with the fiber 1812. Using double-sided substrates as shown in FIG. 12, two or more half coupler modules can be stacked together to form complex switch matrices or networks.

In the above devices, at least one buffer layer of a suitable material such as a dielectric material like silicon dioxide or silicon nitride may be formed over a groove under the fiber. This buffer layer may be designed to have certain mechanical or thermal properties to stabilize the structure formed by the substrate, the buffer layer, and the fiber by reducing the mechanical or thermal stress between the silicon substrate and the glass fiber. Therefore the reliability of the device can be improved. For example, if the substrate is formed of silicon, a dielectric material with a coefficient of thermal expansion (CTE) between the CTE values of the silicon and the glass fiber may be used as the buffer. Two or more buffer layers may also be used to achieve desired stabilizing effects.

Only a few embodiments are disclosed. However, it is understood that variations and enhancements may be made without departing from the spirit of and are intended to be encompassed by the following claims.

What is claimed is:

1. A device, comprising:
   a first substrate having a first elongated groove formed over a first substrate surface;
   a first fiber having a fiber portion engaged in said first elongated groove, a portion of fiber cladding of said fiber portion being removed to form a first side fiber surface spaced from a fiber core of said first fiber within a reach of an evanescent field of a guided mode in said first fiber;
   a second substrate having a second elongated groove formed over a second substrate surface, said second substrate facing said first substrate surface to align said second elongated groove with said first elongated groove;
   a second fiber having a fiber portion engaged in said second elongated groove, a portion of fiber cladding of said fiber portion being removed to form a second side fiber surface spaced from a fiber core of said second fiber and within a reach of an evanescent field of a guided mode in said second fiber, said second side fiber surface being within a reach of said evanescent field of said guided mode in said first fiber; and
   a coupling control layer formed between said first and said second substrate surfaces to have a thickness to allow for evanescent coupling between said first and said second fibers, said coupling control layer responsive to a control signal to change a coupling strength of said evanescent coupling.

2. The device as in claim 1, wherein said coupling control layer changes an optical property in response to optical radiation.

3. The device as in claim 1, wherein said coupling control layer changes an optical property in response to an electric field.

4. The device as in claim 1, wherein said coupling control layer changes an optical property in response to a magnetic field.

5. The device as in claim 1, wherein said coupling control layer changes an optical property in response to a temperature change.

6. The device as in claim 1, wherein said first substrate has a through hole penetrating through said first substrate and one section of said first fiber passes through said through hole.

7. The device as in claim 1, further comprising a third fiber engaged to said first substrate to have a third side fiber surface formed from removal a portion of fiber cladding to allow for evanescent coupling and located on said first substrate surface, wherein said second fiber has a fourth side fiber surface formed from removal a portion of fiber cladding to allow for evanescent coupling and located on said second substrate surface to align with and to evanescently exchange optical energy with said third side fiber surface of said third fiber.

8. The device as in claim 1, wherein said first substrate has an additional elongated groove formed on an opposing substrate surface opposing said first substrate surface and has a through hole adjacent to said additional elongated groove to receive a portion of said first fiber from said first substrate surface, said portion engaged to said additional elongated groove to form an additional side fiber surface from removing fiber cladding for evanescent coupling, and further comprising:

a third substrate having a third elongated groove formed over a third substrate surface;

a third fiber having a fiber portion engaged in said third elongated groove, a portion of fiber cladding of said fiber portion being removed to form a third side fiber surface spaced from a fiber core of said third fiber within a reach of an evanescent field of a guided mode in said third fiber, wherein said third substrate surface faces said opposing substrate surface of said first substrate to align said third side fiber surface with said additional side fiber surface to allow for evanescent coupling between said first and said third fibers; and a second coupling control layer formed between said opposing substrate surface of said first substrate and said third substrate surfaces to have a thickness to allow for evanescent coupling between said first and said third fibers, said second coupling control layer responsive to a second control signal to change a coupling strength of said evanescent coupling between said first and said third fibers.

9. A device, comprising:

a first fiber having a first fiber coupling port formed by removing a portion of fiber cladding to form a first coupling surface within a reach of an evanescent field of a guided optical mode of said first fiber;

a second fiber having a second fiber coupling port formed by removing a portion of fiber cladding to form a second coupling surface within a reach of an evanescent field of a guided optical mode of said second fiber, said second fiber coupled to said first fiber by aligning said first and said second fiber coupling ports to each other to evanescently exchange energy between said first and said second fibers;

a coupling control layer formed between said first and said second fiber coupling ports to have a thickness which allows for evanescent coupling between said first and said second fibers, said coupling control layer responsive to a control signal to change a coupling strength of said evanescent coupling; and a substrate having first and second opposing substrate surfaces and an elongated groove formed over said first substrate surface, and at least one opening formed at one end of said elongated groove and penetrating through said substrate to extend between said first and said second substrate surfaces, wherein said first fiber is engaged to said first substrate surface to place said first fiber coupling port in said elongated groove.

10. The device in claim 9, wherein said first fiber has a first fiber portion that passes through said opening to lay another fiber portion over said second substrate surface, said another fiber portion having a third fiber coupling port formed by removing a portion of fiber cladding to form a third coupling surface within a reach of an evanescent field of a guided optical mode of said first fiber.

11. The device as in claim 10, further comprising a third fiber coupled to said third fiber coupling port to exchange energy via an evanescent field with said first fiber.

12. The device as in claim 9, wherein said coupling control layer changes an optical property in response to optical radiation.

13. The device as in claim 9, wherein said coupling a control layer changes an optical property in response to an electric field.

14. The device as in claim 9, wherein said coupling control layer changes an optical property in response to a magnetic field.

15. The device as in claim 9, wherein said coupling control layer changes an optical property in response to a temperature change.

16. A method, comprising:

causing an optical signal to be sent into a first fiber which has a first fiber coupling port formed by removing a portion of fiber cladding to form a first coupling surface within a reach of an evanescent field of a guided optical mode of said first fiber, wherein said first fiber is coupled to a second fiber through a controllable coupling layer, wherein said second fiber has a second fiber coupling port formed by removing a portion of fiber cladding to form a second coupling surface within a reach of an evanescent field of a guided optical mode of said second fiber and said first and said second fiber coupling ports are aligned to each other to evanescently exchange energy between said first and said second fibers, and wherein said coupling control layer is formed between said first and said second fiber coupling ports to have a thickness which allows for evanescent coupling between said first and said second fibers; and applying a control signal to said coupling control layer to change a coupling strength of said evanescent coupling to either switch said optical signal into said second optical fiber or maintain said optical signal in said first optical fiber.

17. The method as in claim 16, further comprising:

providing a substrate having first and second opposing substrate surfaces and an elongated groove formed over said first substrate surface, and at least one opening formed at one end of said elongated groove and penetrating through said substrate to extend between said first and second substrate surfaces; and engaging said first fiber to said first substrate surface to place said first fiber coupling port in said elongated groove.

18. The method as in claim 17, wherein said first fiber has a portion that passes through said opening to be over said second substrate surface, and wherein said portion over said second substrate surface has an additional fiber coupling port formed by removing a portion of fiber cladding to form an additional coupling surface within a reach of an evanescent field of a guided optical mode of said first fiber, and said method further comprising engaging said additional fiber coupling port of said first fiber to a third fiber to evanescently exchange optical energy between said first and said third fibers, wherein said third fiber has a third fiber coupling port formed by removing a portion of fiber cladding to form a third coupling surface within a reach of an evanescent field of a guided optical mode of said third fiber, and wherein said third coupling surface is aligned with said additional coupling surface of said first fiber for evanescent coupling.

19. The method as in claim 16, wherein said coupling control layer includes an electro-optic material and said control signal includes an electric field applied to said electro-optic material.

20. The method as in claim 16, wherein said coupling control layer includes a photo-sensitive optical material, and said control signal includes external optical radiation illuminating said optical material.

21. The method as in claim 16, wherein said coupling control layer includes a ferro-optical material, and said control signal includes a magnetic field applied to said ferro-optical material.

22. The method as in claim 16, wherein said coupling control layer includes a thermo-optic material, and said control signal operates to control a temperature of said thermo-optic material.

* * * * *